United States Patent Office 3,763,104
Patented Oct. 2, 1973

3,763,104
PRODUCTION OF PARA-SUBSTITUTED PHENOL/ FORMALDEHYDE RESINS USING HETEROGENEOUS MULTI-PHASE REACTION MEDIUM
Alan David Buchanan, Rosanna, Victoria, Australia, assignor to Monsanto Australia Limited, Melbourne, Victoria, Australia
No Drawing. Original application Feb. 26, 1970, Ser. No. 14,664. Divided and this application May 19, 1972, Ser. No. 254,854
Int. Cl. C08g 5/08
U.S. Cl. 260—53 R            9 Claims

ABSTRACT OF THE DISCLOSURE

Process for the production of alkyl or aryl p-substituted phenol/formaldehyde resins in which a phenolic component such as an alkyl p-substituted phenol or an aryl p-substituted phenol is first reacted with formaldehyde in the presence of an inorganic alkaline catalyst in a heterogeneous multi-phase reaction medium after which the reaction product is etherified to produce the desired resin product.

---

This application is a division of application Ser. No. 14,664, filed Feb. 26, 1970, now U.S. Pat. 3,677,986.

BACKGROUND

This invention relates to a process for the production of alkyl or aryl para-substituted phenol/formaldehyde resins, particularly resins of this class derived from alkyl or aryl para-substituted phenols in which the para-substituent conveniently contains not more than twenty carbon atoms, preferably not more than ten carbon atoms, for example p-isopropyl phenol or p-tert.butyl phenol or p-tert.amyl phenol or p-octyl phenol or p-nonyl phenol or p-phenyl phenol or p-cumyl phenol. Resins of this class have various commercial uses, particularly in the preparation of adhesives, varnishes or paints, for example tert.butyl p-substituted phenol/formaldehyde resins are reacted with inorganic compounds to form a chelate with the resin for use in conjunction with neoprene to make adhesives, or are modified with rosin or an unsaturated oil for use in varnishes or paints.

Treating the production of tert.butyl p-substituted phenol/formaldehyde resins as being exemplary of the present class of resins for the purpose of discussion and comparison with relation to the process of the invention, it is to be noted that such resins contain predominantly ether groups formed from the condensation of the monomeric addition product 2-methylol or 2,6-dimethylol p-tert.butyl phenol or mixtures thereof. The chain formed by this condensation reaction, which usually has a molecular weight in the range of 300–1500, terminates with methylol groups. These resins have previously been made by low temperature (circa 50° C.) reaction of p-tert.butyl phenol with formalin in the presence of approximately molar proportions of alkali catalyst, e.g. approximately one mole NaOH per mole of p-tert.butyl phenol, the reaction producing the addition product 2-methylol or 2,6-dimethylol p-tert.butyl phenol or mixtures thereof. The alkali catalyst is subsequently neutralized with acid, e.g. NaSO$_4$, and the salt therefrom washed from the resin with several aqueous washings. The 2-methylol or 2,6-dimethylol p-tert.butyl phenol or mixtures thereof formed is subsequently condensed and dehydrated at a suitable (neutral) pH which will convert the monomeric mono or dimethylol into an ether link chain of molecular weight in the range of 300–1500 and terminating with methylol groups.

On a commercial scale a process for the production of tert.butyl p-substituted phenol/formaldehyde resin, based upon prior knowledge of the art, would be as follows: 1 mole p-tert.butyl phenol and 0.7 mole caustic soda are dissolved in water at approximately 80–90° C. and then cooled to 50° C. 37% formalin is metered into this solution over a period of three hours, followed by a digestion period of three hours at 65° C. The resin solution is then neutralized, allowed to settle, the aqueous layer removed, the remaining resin-producing addition product washed three times with water, then heated to etherify and dehydrate to a brittle resin. This process, however, has several serious disadvantages. Thus reaction of formaldehyde with p-tertiary butyl phenol is relatively slow and requires comparatively high concentrations of alkali; moreover high alkali concentration causes further difficulties in that it correspondingly requires comparatively high concentrations of acid for the neutralization step, which in turn produces comparatively high salt concentrations which require thorough washing for removal from the resin-forming addition-product; moreover washing reduces the yield of the resin-forming addition product and is a time-consuming step in the production of the resin.

SUMMARY

The present invention provides a process for the production of alkyl or aryl p-substituted phenol/formaldehyde resins in which a phenolic component selected from alkyl p-substituted phenols, aryl p-substituted phenols, and mixtures of said phenols, is reacted with formaldehyde or a source of formaldehyde in the presence of an inorganic alkaline catalyst for the initial formation of a 2-methylol or 2,6-dimethylol p-alkyl or p-aryl substituted phenol monomeric addition product or mixture of said products and subsequent etherification to the alkyl or aryl p-substituted phenol/formaldehyde resin, which process materially overcomes the disadvantages of the prior art processes so indicated. The process of the invention comprises heating said phenolic component with the formaldehyde or source of formaldehyde in the presence of the inorganic alkaline catalyst in a heterogeneous multi-phase reaction medium having an aqueous phase and a water-immiscible phase to form said 2-methylol or 2,6-dimethylol p-alkyl or p-aryl substituted phenol monomeric addition product or mixture of said product, and effecting etherification of said monomeric addition product or mixture of said products into the alkyl or aryl p-substituted phenol/formaldehyde resin and obtaining said resin free or substantially free of said inorganic alkaline catalyst, by heating said monomeric addition product or mixture of said products which is in the water-immiscible phase to effect etherification of said monomeric addition product or mixture of said products to the alkyl or aryl p-substituted phenol/formaldehyde resin before or after a substantially-neutralizing or completely-neutralizing or acidifying step in which all or substantially all of said inorganic alkaline catalyst is converted into a salt which enters said aqueous phase, and separating said aqueous phase containing said salt from said water-immiscible phase containing the alkyl or aryl p-substituted phenol/ formaldehyde resin.

Thus the basis of the process of the invention is the condensation of formaldehyde with a phenolic component as indicated by reacting formaldehyde or a source of formaldehyde with the phenolic component in the presence of an inorganic alkaline catalyst in a heterogeneous multi-phase reaction medium having an aqueous phase and a water-immiscible phase. Such a reaction system permits the completion of the initial condensation step in a comparatively short period of time, moreover it has been found that the amount of inorganic alkaline catalyst can be substantially reduced, arising from which the amount of acid to neutralize the inorganic alkaline catalyst can be correspondingly reduced. In addition it has been found that the water-immiscible phase contains the resin-forming addition product and certain other high condensation products, which provides a most convenient means of partitioning into the aqueous layer, the salt formed by neutralization of the inorganic alkaline catalyst component, whereby said salt can be readily removed from the system by draining off said aqueous phase. The resin-forming monomeric addition product present in the water-immiscible phase can be subjected to etherification and dehydration without washing, which results in corresponding substantial yield improvements. Each of these advantages, i.e. comparatively shorter condensation time, comparatively lower concentration of inorganic alkaline catalyst, comparatively lower concentration of acid, comparatively less formation of salt, and comparatively ready separation of aqueous phase, additionally provide a substantial reduction in the time cycle required to produce the resin.

DETAILED DESCRIPTION

Various procedures can be operated in carrying out the process of the invention. One such procedure comprises heating the phenolic component with the formaldehyde or source of formaldehyde in the presence of the inorganic alkaline catalyst in the heterogeneous multi-phase reaction medium having the aqueous phase and the water-immiscible phase to form said 2-methylol or 2,6-dimethylol p-alkyl or p-aryl substituted phenol monomeric addition product or mixture of said products which enters said water-immiscible phase, adding an acid to the reaction medium in an amount sufficient to substantially neutralize or completely neutralize or acidify the reaction medium whereby said inorganic alkaline catalyst is converted into a salt which enters the aqueous phase, removing said aqueous phase containing said salt from the water-immiscible phase containing said monomeric addition product, and heating said water-immiscible phase containing the monomeric addition product to effect etherification of the monomeric addition product to the alkyl or aryl p-substituted phenol/formaldehyde resin and remove some or all of the water-immiscible phase by distillation.

According to one practical embodiment of said procedure, the phenolic component, a formalin solution and a water-immiscible component are charged into a reaction vessel and heated conveniently to a temperature within the range of 40–100° C. to reflux in the reaction vessel whilst an aqueous solution of the inorganic alkaline catalyst is being metered into the reaction vessel and the reaction mixture refluxed for a period of ½–3 hours to form a 2-methylol or 2,6-dimethylol p-alkyl or p-aryl substituted phenol monomeric addition product or mixture of said product preferably having a molecular weight in the order of 250; an aqueous acid solution is charged into the reaction vessel in an amount sufficient to substantially neutralize or completely neutralize or acidify the reaction mixture to a pH in the range of pH 2–8; the reaction mixture allowed to settle and the water/salt phase layer removed from the reaction vessel; and the water-immiscible phase in the reaction vessel heated conveniently to a temperature within the range of 60–180° C. for a period of 1–7 hours to effect etherification of the 2-methylol or 2,6-dimethylol p-alkyl or p-aryl substituted phenol monomeric addition product to an alkyl or aryl p-substituted phenol/formaldehyde resin preferably having a molecular weight in the order of 500–1500 and optionally remove some or all of the water-immiscible component by distillation.

According to another practical embodiment of said procedure, the phenolic component, a formalin solution, the water-immiscible component and an aqueous solution of the inorganic alkaline catalyst can be charged into a reaction vessel and heated conveniently to a temperature within the range of 40–100° C. to reflux in the reaction vessel for a period of ½–3 hours to form a 2-methylol or 2,6-dimethylol p-alkyl or p-aryl substituted phenol monomeric addition product or mixture of said products preferably having a molecular weight in the order of 250; an aqueous acid solution charged into the reaction vessel in an amount sufficient to substantially completely neutralize or completely neutralize or acidify the reaction mixture to a pH in the range of pH 2–8; the reaction mixture allowed to settle and the water/salt phase layer removed from the reaction vessel; and the water-immiscible phase in the reaction vessel heated conveniently to a temperature within the range of 60–180° C. for a period of 1–7 hours to effect etherification of the 2-methylol or 2,6-dimethylol p-alkyl or p-aryl substituted phenol monomeric addition product or mixture of said products to an alkyl or aryl p-substituted phenol/formaldehyde resin preferably having a molecular weight in the order of 500–1500 and optionally remove some or all of the water-immiscible component by distillation.

According to yet another practical embodiment of said procedure, the phenolic component, the water-immiscible component and an aqueous solution of the inorganic alkaline catalyst are charged into a reaction vessel and heated conveniently to a temperature within the range of 40–100° C. to reflux in the reaction vessel for a period of ½–3 hours whilst a formalin solution is being metered into the reaction vessel to form a 2-methylol or 2,6-dimethylol p-alkyl or p-aryl substituted phenol monomeric addition product or mixture of said products preferably having a molecular weight in the order of 250; an aqueous acid solution is charged into the reaction vessel in an amount sufficient to substantially neutralize or completely neutralize or acidify the reaction mixture to a pH in the range of pH 2–8; the reaction mixture allowed to settle and the water/salt phase layer removed from the reaction vessel; and the water-immiscible phase in the reaction vessel heated conveniently to a temperature within the range of 60–180° C. for a period of 1–7 hours to effect etherification of the 2-methylol or 2,6-dimethylol p-alkyl or p-aryl substituted phenol monomeric addition product or mixture of said products to an alkyl or aryl p-substituted phenol/formaldehyde resin preferably having a molecular weight in the order of 500–1500 and optionally remove some or all of the water-immiscible component by distillation.

In operating said procedure or any of the practical embodiments indicated, the water-immiscible phase containing the monomeric addition product can be subjected to azeotropic distillation in the etherification stage for removal of the etherification water-of-reaction and optionally remove some of the water-immiscible phase to obtain the alkyl or aryl p-substituted phenol/formaldehyde resin in liquid form in the water-immiscible phase or in the residual portion of said phase upon removal of some of said phase in carrying out the azeotropic distillation. Alternatively the water-immiscible phase containing the monomeric addition product can be subjected to distillation in the etherification stage for removal of the etherification water-of-reaction and all of the water-immiscible phase to obtain the alkyl or aryl p-substituted phenol/formaldehyde resin in solid form.

Another or second procedure for carrying out the process of the invention comprises heating the phenolic component with the formaldehyde or source of formaldehyde in the presence of the inorganic alkaline catalyst in the heterogeneous multi-phase reaction medium having the aqueous phase and the water-immiscible phase to form said 2-methylol or 2,6-dimethylol p-alkyl or p-aryl substituted phenol monomeric addition product or mixture of said products and which is in said water-immiscible phase, continuing the heating to effect etherification of the monomeric addition product in said water-immiscible phase to the alkyl or aryl p-substituted phenol/formaldehyde resin, adding an acid to the reaction medium in an amount sufficient to substantially neutralize or completely neutralize or acidify the reaction medium whereby said inorganic alkaline catalyst is converted into a salt which enters the aqueous phase, removing said aqueous phase containing said salt from the water-immiscible phase containing the alkyl or aryl p-substituted phenol/formaldehyde resin, and optionally removing some or all of the water-immiscible phase by distillation.

According to one practical embodiment of said second procedure, the phenolic component, a formalin solution and the water-immiscible component are charged into a reaction vessel and heated conveniently to a temperature within the range of 40–100° C. to reflux in the reaction vessel for a period of ½–3 hours whilst an aqueous solution of the inorganic alkaline catalyst is being metered into the reaction vessel; the reaction mixture refluxed for a further period of 1–7 hours to form and convert said 2-methylol or 2,6-dimethylol p-alkyl or p-aryl substituted phenol monomeric addition product or mixture of said products into an alkyl or aryl p-substituted phenol/formaldehyde resin preferably having a molecular weight in the order of 500–600; an aqueous acid solution is charged into the reaction vessel in an amount sufficient to substantially neutralize or completely neutralize or acidify the reaction mixture to a pH in the range of pH 2–8; the reaction mixture allowed to settle and the water/salt phase layer removed from the reaction vessel; and the water-immiscible phase in the reaction vessel optionally heated conveniently to a temperature within the range of 60–180° C. to remove some or all of the water-immiscible component by distillation.

According to another practical embodiment of said second procedure, the phenolic component, a formalin solution, the water-immiscible component and an aqueous solution of the inorganic alkaline catalyst are charged into a reaction vessel and heated conveniently to a temperature within the range of 40–100° C. to reflux in the reaction vessel for a period of 4–10 hours to form and convert said 2-methylol or 2,6-dimethylol p-alkyl or p-aryl substituted phenol monomeric addition product or mixture of said products to an alkyl or aryl p-substituted phenol/formaldehyde resin preferably having a molecular weight in the order of 500–600; an aqueous acid solution is charged into the reaction vessel in an amount sufficient to substantially completely neutralize or completely neutralize or acidify the reaction mixture to a pH in the range of pH 2–8; the reaction mixture allowed to settle and the water/salt phase layer removed from the reaction vessel; and the water-immiscible phase in the reaction vessel optionally heated conveniently to a temperature within the range of 60–180° C. to remove some or all of the water-immiscible component by distillation.

According to yet another practical embodiment of said second procedure, the phenolic component, the water-immiscible component and an aqueous solution of the inorganic alkaline catalyst are charged into a reaction vessel and heated conveniently to a temperature within the range of 40–100° C. to reflux in the reaction vessel for a period of ½–3 hours whilst a formalin solution is being metered into the reaction vessel and the heating continued for a further period of 1–7 hours to form and convert said 2-methylol or 2,6-dimethylol p-alkyl or p-aryl substituted phenol monomeric addition product or mixture of said products to an alkyl or aryl p-substituted phenol/formaldehyde resin preferably having a molecular weight in the order of 500–600; an aqueous acid solution is charged into the reaction vessel in an amount sufficient to substantially neutralize or completely neutralize or acidify the reaction mixture to a pH in the range of pH 2–8; the reaction mixture allowed to settle and the water/salt phase layer removed from the reaction vessel; and the water-immiscible phase in the reaction vessel optionally heated conveniently to a temperature within the range of 60–180° C. to remove some or all of the water-immiscible component by distillation.

In operating said second procedure or any of the practical embodiments indicated, the water-immiscible phase containing the alkyl or aryl p-substituted phenol/formaldehyde resin can be subjected to azeotropic distillation for removal of any residual water and optionally remove some of the water-immiscible phase to obtain the alkyl or aryl p-substituted phenol/formaldehyde resin in liquid form in the water-immiscible phase or in the residual portion of said phase upon removal of some of said phase in carrying out the azeotropic distillation. Alternatively the water-immiscible phase containing the alkyl or aryl p-substituted phenol/formaldehyde resin can be subjected to distillation for removal of any residual water and all of the water-immiscible phase to obtain the alkyl or aryl p-substituted phenol/formaldehyde resin in solid form. In all cases where such distillation takes place, the molecular weight of the resin may increase from the order of 600 to the order of 1500.

A third procedure according to the invention comprises heating the phenolic component with formaldehyde or a formaldehyde source in the presence of the inorganic alkaline catalyst in the heterogeneous multi-phase reaction medium having the aqueous phase and the water-immiscible phase to form said 2-methylol or 2,6-dimethylol p-alkyl or p-aryl substituted phenol monomeric addition product or mixture of said products and which is in said water-immiscible phase, removing the aqueous phase from the water-immiscible phase and heating said water-immiscible phase to effect etherification of the monomeric addition product to the alkyl or aryl p-substituted phenol/formaldehyde resin and remove the etherification water-of-reaction by azeotropic distillation, adding water and an acid or an aqueous solution of an acid to the resultant water-immiscible phase containing the alkyl or aryl p-substituted phenol/formaldehyde resin in an amount sufficient to substantially neutralize or completely neutralize or acidify the resultant medium whereby said inorganic alkaline catalyst is converted into a salt which enters the resultant aqueous phase, and removing said aqueous phase containing said salt from said water-immiscible phase containing the alkyl or aryl p-substituted phenol/formaldehyde resin.

The initial and final stages of said third procedure can be operated substantially in accordance with any one of the practical embodiments described above with reference to the first-mentioned procedure. That is to say, for example, the various components can be charged into a reaction vessel and heated conveniently to a temperature within the range of 40–100° C. to reflux for a period of ½–3 hours in the manner described in any one of said practical embodiments of the first-mentioned procedure to form said 2-methylol or 2,6-dimethylol p-alkyl or p-aryl substituted phenol monomeric addition product or mixture of said products; the water-immiscible phase heated to reflux for a period of 1–7 hours to effect etherification and remove the etherification water-of-reaction by azeotropic distillation; an aqueous acid solution charged into the reaction vessel in an amount until the pH of the reaction mixture is in the range of pH 2–8; the mass in the reaction vessel allowed to settle so that the aqueous phase containing said salt can be readily removed from the reaction vessel; and optionally heating the water-immiscible phase containing the alkyl or aryl p-substituted phenol/formaldehyde resin conveniently at a temperature within the range of 60–180° C. to remove some or all of the water-immiscible components by distillation. Similarly, the resultant water-immiscible phase can be removed from the alkyl or aryl p-substituted phenol/formaldehyde resin by distillation to obtain the alkyl or aryl p-substituted phenol/formaldehyde resin in solid form. In all cases where such distillation takes place, the molecular weight of the resin may increase from the order of 600 to the order of 1500.

Any suitable source of formaldehyde may be used in the process of the invention. Although paraform may be used for the purpose, formalin is the most convenient form of the material, suitably in concentrations of 30–

60% wt. of formaldehyde, preferably the commercially available 37% formalin solution or 50% formalin solution, since this incidentally provides at least part of the water required for the aqueous phase of the heterogeneous multi-phase reaction medium. Modified formalin solutions, that is to say, formalin solutions containing other alkanols such as butanol, as well as the methanol component, or in place of the methanol component, may also be used.

Molar ratio of the formaldehyde/phenolic reactants can be as low as 0.5:1 however it is more conveniently between 1.0 to 2.5 and still more conveniently between 1.25 to 2.5 moles of formaldehyde per mole of the phenolic reactant, for example, within the range of 1.5 to 2.5 moles of formaldehyde, and preferably within the range of 1.7 to 2.1 moles of formaldehyde, per mole of phenolic reactant. Preference for these ranges of molar ratios is because molar ratios higher than 2.1:1.0 formaldehyde/phenolic reactant tend to give the resin an undesirable odour of formaldehyde, whilst molar ratios lower than 1.5:1.0 formaldehyde/phenolic reactant tend to cause a lower rate of reactivity with inorganic compounds to form a chelate with the resultant resin, leading to slower adhesive strength-development when incorporated with neoprene in the preparation of neoprene adhesives.

Inorganic alkaline catalysts preferred for operating the process of the invention are the alkali metal oxides or hydroxides or carbonates, particularly sodium hydroxide or potassium hydroxide or sodium carbonate or potassium carbonate. Other alkali metal compounds, such as the corresponding lithium compounds, may however be used equally effectively. Molar ratios of inorganic alkaline catalyst to phenolic reactant conveniently are in the order of 0.040 to 0.50 mole of catalyst per mole of phenolic reactant, conveniently 0.075 to 0.50 mole of catalyst per mole of phenolic reactant, with a preference for a molar ratio of 0.1 to 0.35 mole of catalyst per mole of phenolic reactant. Utilizing sodium hydroxide as the catalyst and p-tert.butyl phenol as the phenolic reactant, the amount of sodium hydroxide can be 3 to 20 parts per mole of p-tert.butyl phenol, which is equivalent to the molar ratio of 0.075 to 0.50 mole of catalyst per mole of phenolic reactant, the amount of sodium hydroxide preferably being 4 to 13 parts per mole of p-tert.butyl phenol, which is equivalent to the preferred molar ratio of 0.1 to 0.33 mole of catalyst per mole of phenolic reactant. High levels of catalyst, for example in excess of 20 parts NaOH/mole of p-tert.butyl phenol, correspondingly increases the amount of salt formed in the neutralization/acidification stage and to the point where it becomes necessary to wash the monomeric addition produce free of salt, which is to be avoided, whilst costs are undesirably and unnecessarily raised due to increased consumption of catalyst and acid.

Charging of the catalyst into the reaction vessel is preferably accomplished by having the catalyst in the form of an aqueous solution, conveniently as a 10–50% wt. solution of catalyst, preferably as a 10–33% wt. solution of catalyst, or still more preferably as a 15–25% wt. solution of catalyst, in incidentally providing at least part of the aqueous phase of the heterogeneous multi-phase reaction medium and maintaining processing capacity and reaction control. The aqueous phase water content per mole of phenolic component conveniently is 45–200 parts by weight with a preferred water content of 70–160 parts per mole of phenolic component.

Water-immiscible aliphatic and/or aromatic hydrocarbons or esters or alcohols or others or other water-immiscible organic materials which are non-reactive with the phenolic or formaldehyde components or the condensation products under the processing conditions of the invention, can conveniently constitute the water-immiscible phase, the preferred materials being aliphatic and/or aromatic hydrocarbons, especially those having a boiling point of 70–160° C. Toluene is the preferred hydrocarbon for the purpose, however, benzene or xylene or any one of the various organic solvents of this type may be equally well employed, for example the proprietary products identified as "Shell X60," which is a 90% paraffinic type of organic solvent. The hydrocarbon phase (or other water-immiscible phase) of the heterogeneous multi-phase reaction medium may amount to 25–300 parts wt./mole of phenolic reactant, more particularly 25–100 parts wt./mole of phenolic reactant, however in practice the amount advantageously is approximately equal in parts by weight with that of the phenolic reactant. Amounts of hydrocarbon phase (or other water-immiscible phase) lower than 50 parts/mole of phenolic reactant tend to give poor salt separation, as between the water-immiscible phase/aqueous phase, which would fail to provide the desired salt-free resin and would undesirably require the resin to be washed free of salt, hence it is preferred to operate the process with not less than 50 parts of water-immiscible phase/mole of phenolic reactant.

Any inorganic or organic acid may be employed for the substantial neutralization or complete neutralization for acidification of the reaction mixture as described. Readily suitable acids are sulfuric or phosphoric or formic or oxalic acids, the preferred acid being oxalic or phosphoric acid because they tend not to cause discolouration of the resin, i.e. they assist in the production of so-called light-coloured resins. Addition of acid in the neutralization stage, so-called, preferably is such that the reaction medium reaches a pH within the range of pH 2–8, conveniently within the range of pH 2.5–8 and preferably within the range of pH 5–7. A pH much above pH 7 or much below pH 3 tends to promote undesired methylene bridge formation in the resin, instead of ether linkage as required, hence this stage of the process desirably is operated within the limit of the pH range so indicated.

Ending the etherification stage of the process of the invention before the complete dehydration of the resin or the complete removal of the water-immiscible component from the resin, which otherwise results in the production of the alkyl or aryl p-substituted phenol/formaldehyde resin in the solid or brittle form, is convenient as it results in the production of a liquid-form resin which can be readily reacted with an inorganic compound so as to form a chelate with the resin, which, on mixing with neoprene or the like, improves the strength and heat resistance of the neoprene as an adhesive. In this case the water-immiscible phase containing the alkyl or aryl p-substituted phenol/formaldehyde resin in solution is allowed to cool in the reaction vessel and then mixed therein or elsewhere, suitably at ambient temperature, with the inorganic compound, such as magnesium oxide or zinc oxide, in forming a chelate with the resin. Alternatively the solid-form alkyl or aryl p-substituted phenol/formaldehyde resin can be dissolved in an organic solvent, such as any one or a mixture of the water-immiscible materials specifically referred to above, for reconstituting the resin in liquid form for ready reaction with the inorganic compound in forming a chelate with the resin, as indicated.

EMBODIMENTS

The following non-limitative examples illustrate the process of the present invention:

Example 1

A reaction system consisting of 300 grams p-tert.butyl phenol, 240 grams formalin (50% wt.), 12 grams solid caustic soda dissolved in 120 grams of water to form a 10% aqueous solution, and 300 grams toluene, was provided. The toluene, p-tert.butyl phenol and formalin were heated to reflux (89° C.) in a reaction vessel and the caustic soda solution was metered into the reaction vessel during a period of 1 hour. The reaction mixture was refluxed for a further 1 hour; then neutralized with 11 grams phosphoric acid (89% wt.) to a pH of about pH 7; the aqueous/salt base (bottom layer) drained off; and the resin-forming product present in the toluene etherified by distilling off the toluene, commencing at 60–65° C. and approximately 15" vacuum and rising to 110–115° C. at approximately 15" vacuum in 1.5–3.0 hours. The system was then held at 114–120° C. and approximately 15" vacuum for 1–3 hours to complete the etherification when a brittle resin of molecular weight in the range of 700–1000 was obtained with a yield of 128% based on the butyl phenol and an overall cycle time of 9–12 hours.

In comparison, operating a process according to the prior art as discussed above, the amount of caustic soda required would have been 57.9 grams; the amount of acid required would have been 53.1 grams; the time taken for catalyst addition and refluxing would have been 6 hours; the time required to wash the resin free of salt would have been 6 hours; the yield of resin in brittle form would have been 110% based on the phenolic component; and an overall cycle time of 22–26 hours.

Example 2

A reaction system consisting of 150 grams p-tert.butyl phenol, 162 grams formalin (37%), 6 grams solid caustic soda dissolved in 40 grams of water, and 150 grams toluene, was provided, 7.3 grams sulphuric acid (98%) being provided for neutralization. The reaction mixture was processed and the resin recovered as described in Example 1.

Example 3

A resin in solution form was prepared from a reaction mixture as described in Example 2, which was processed as in Example 1 until a brittle resin was obtained, then 195 grams toluene was added, the mixture cooled to 25° C., then 15 grams magnesium oxide was added and the mixture allowed to react for 3 hours at room temperature to effect chelation.

Example 4

A reaction mixture in accordance with Example 2 except that 170 grams p-phenylphenol was used in place of the p-tert.butyl phenol component, was processed in accordance with Example 2.

Example 5

A reaction mixture in accordance with Example 2 except that 212 grams p-cumylphenol was used in place of the p-tert.butyl phenol component, was processed in accordance with Example 2.

Example 6

A reaction system consisting of 300 grams of p-tert.butyl phenol, 240 grams (50%) formalin, 12 grams solid caustic soda in 120 grams of water to form a 10% aqueous solution and 300 grams of toluene was provided. The toluene, p-tert.butyl phenol and formalin were heated to reflux (89° C.) in a reaction vessel and the caustic soda was metered into the reaction vessel during a period of one hour. The reaction mixture was refluxed for a further four hours, producing a resinous product having a molecular weight in the order of 400; the mixture neutralized with 11 grams phosphoric acid (89%) to a pH of about 7.0; the aqueous layer (bottom layer) drained off; the toluene/resin solution cooled below 25° C.; 17.0 grams of magnesium oxide was added; and the mixture reacted at a temperature below 25° C. for 3 hours.

Example 7

A neoprene adhesive composition was prepared by mixing 15.4 grams of the resin solution obtained according to Example 3, with 24.3 grams toluene, and the mixture added to 53.5 grams neoprene solution; the neoprene solution being prepared by milling 586 grams Neoprene A D20, 23.4 grams magnesium oxide and 29.3 grams zinc oxide then dissolving in 1500 grams toluene.

Example 8

A reaction system consisting of 600 grams p-tert.butyl phenol, 600 grams benzene, 330 grams 37% formalin (8% methanol), and 24 grams caustic soda dissolved in 200 grams water, was provided. The p-tert.butyl phenol, benzene and formalin were heated to reflux in a reaction vessel and the caustic soda solution was metered into the reaction vessel during a period of ½ hour. The reaction mixture was refluxed for an additional period of 8 minutes; acidified with 36 grams phosphoric acid (89% wt.) to pH 6.8; the aqueous/salt phase (bottom layer) drained off; and the resin-forming product present in solution in the residual benzene was etherified by azeotropic distillation of said solution for a period of 2.5 hours, commencing at 75° C. and rising to 87° C. at approximately atmospheric pressure, 85 mls. of water being removed. The etherified resin in the resultant benzene solution was then reacted with 60 grams magnesium oxide at 25° C. for 3 hours to effect chelation. A sample of the resin before the chelation reaction with the magnesium oxide, exhibited a magnesium oxide reactivity of 96.0%, as hereinafter defined.

Example 9

A reaction system consisting of 600 grams p-tert.butyl phenol, 600 grams toluene, 480 grams 37% formalin (8% methanol), and 24 grams caustic soda dissolved in 200 grams water, was provided. The p-tert.butyl phenol, toluene and formalin were heated to reflux in a reaction vessel and the caustic soda solution was metered into the reaction vessel during a period of 1 hour. The reaction mixture was refluxed for an additional period of 1 hour; substantially neutralized with 27.1 grams phosphoric acid (89% wt.) to pH 7.1; the aqueous/salt phase (bottom layer) drained off; and the resin-forming product present in solution in the residual toluene was etherified by azeotropic distillation of said solution for a period of 2.5 hours, commencing at 86° C. and rising to 115° C. at approximately atmospheric pressure, 133 mls. of water being removed. The etherified resin in the resultant toluene solution was then reacted with 60 grams magnesium oxide at 25°C . for 3 hours to effect chelation. A sample of the resin before the chelation reaction with the magnesium oxide, exhibited a magnesium oxide reactivity of 69.8%, as hereinafter defined.

Example 10

A reaction system consisting of 600 grams p-tert.butyl phenol, 600 grams toluene, 325 grams 37% formalin (8% methanol), and 12 grams caustic soda dissolved in 120 grams water, was provided. The p-tert.butyl phenol, toluene and formalin were heated to reflux in a reaction vessel and the caustic soda solution was metered into the reaction vessel during a period of 1 hour. The reaction mixture was refluxed for an additional period of 1 hour; neutralized with 12 grams phosphoric acid (89% wt.) to pH 7.0; the aqueous/salt phase (bottom layer) drained off; and the resin-forming product present in solution in the residual toluene was etherified by azeotropic distillation of said solution for a period of 1.25 hours, commencing at 86° C. and rising to 116° C. at approximately atmospheric pressure, 120 mls. of water being removed. The etherified resin in the resultant toluene solution was then reacted with 60 grams magnesium oxide at 25° C. for 3 hours to effect chelation. A sample of the resin before the chelation reaction with the magnesium oxide, exhibited a magnesium oxide reactivity of 68.3%, as hereinafter defined.

Example 11

A reaction system consisting of 450 grams p-tert.butyl phenol, 450 grams toluene, 377 grams 49.4% formalin, and 18 grams caustic soda dissolved in 180 grams water, was provided. The p-tert.butyl phenol, toluene and formalin were heated to reflux in a reaction vessel and the caustic soda solution was metered into the reaction vessel during a period of 1 hour. The reaction mixture was refluxed for an additional period of 50 minutes; the aqueous phase drained off; the resin-forming product present in solution in the residual toluene was etherified by azeotropic distillation of said solution for a period of 1.5 hours, commencing at 86° C. and rising to 113° C. at approximately atmospheric pressure, 138 mls. of water being removed; 500 mls. of water added to the resultant toluene solution of the etherified resin; the resultant mixture heated to reflux and acidified to pH 6–8 by addition of 16.5 grams phosphoric acid (89% wt.); the aqueous/salt phase (bottom layer) drained off; and the etherified resin in the resultant toluene solution reacted with 45 grams magnesium oxide at 25° C. for 3 hours to effect chelation. Evaporation of the toluene from a sample of the toluene solution of the etherified resin before chelation resulted in a white resin solid having a molecular weight of 606.

Example 12

A reaction system consisting of 600 grams p-tert.butyl phenol, 600 grams toluene, 480 grams 37% formalin (8% methanol), and 24 grams caustic soda dissolved in 200 grams water, was provided. The p-tert.butyl phenol, toluene and formalin were heated to reflux in a reaction vessel and the caustic soda solution was metered into the reaction vessel during a period of 1 hour. The reaction mixture was refluxed for an additional period of 1 hour; the aqueous phase drained off; the resin-forming product present in solution in the residual toluene was etherified by azeotropic distillation of said solution for a period of 1.5 hours, commencing at 86° C. and rising to 115° C. at approximately atmospheric pressure, 100 mls. of water being removed; 800 mls. of water added to the resultant toluene solution of the etherified resin; the resultant mixture heated to reflux and acidified to pH 4.2 by addition of 26 grams phosphoric acid (89% wt.); the aqueous/salt phase (bottom layer) drained off; and the etherified resin (molecular weight approximately 1240) in the resultant toluene solution reacted with 60 grams of magnesium oxide at 25° C. for 3 hours to effect chelation.

Example 13

A reaction system consisting of 900 grams p-tert.butyl phenol, 900 grams toluene, 960 grams 37% formalin (1% methanol), 185 grams methanol, and 36 grams caustic soda dissolved in 180 grams water, was provided. The p-tert.butyl phenol, toluene, formalin and methanol were heated to reflux in a reaction vessel and the caustic soda solution was metered into the reaction vessel during a period of 1 hour. The reaction mixture was refluxed for an additional period of 2.25 hours; the aqueous phase drained off; the resin-forming product present in solution in the residual toluene-methanol solution was etherified by azeotropic distillation of said solution for a period of 1.5 hours, commencing at 82° C. and rising to 110° C. at approximately atmospheric pressure, 456 mls. of water and the methanol being removed; 800 grams of water added to the resultant toluene solution of the etherified resin; the resultant mixture neutralized by addition of 36 grams phosphoric acid (89% wt.); the aqueous/salt phase (bottom layer) drained off; and the etherified resin in the resultant toluene solution reacted with 90 grams of magnesium oxide at 25° C. for 3 hours to effect chelation.

Example 14

A reaction system consisting of 300 grams p-tert.butyl phenol, 300 grams toluene, 120 grams 50.1% formalin, and 6 grams caustic soda dissolved in 80 grams water, was provided. The p-tert.butyl phenol, toluene and formalin were heated to reflux in a reaction vessel and the caustic soda solution was metered into the reaction vessel during a period of 1 hour. The reaction mixture was refluxed for an additional period of 1 hour; acidified to pH 6.8 by addition of 6.1 grams phosphoric acid (89% wt.); the aqueous/salt phase (bottom layer) drained off; and the resin-forming product present in solution in the residual toluene was etherified by distillation of said solution for a period of 1 hour, commencing at 70° C. under 15" vacuum and rising to 120° C. under 25" vacuum. The resultant solid resin exhibited a magnesium oxide reactivity of 60%, as hereinafter defined.

Example 15

A reaction system consisting of 600 grams p-tert.butyl phenol, 600 grams toluene, 480 grams 50% formalin, and 33.7 grams caustic potash dissolved in 240 grams water, was provided. The p-tert.butyl phenol, toluene and formalin were heated to reflux in a reaction vessel and the caustic potash solution was metered into the reaction vessel during a period of 1 hour. The reaction mixture was refluxed for an additional period of 1 hour; acidified to pH 4.1 by the addition of 38.5 grams formic acid (85% wt.); the aqueous/salt phase (bottom layer) drained off; and the resin-forming product present in solution in the residual toluene was etherified by distillation of said solution for a period of 1¾ hours, commencing at 86° C. under 15" vacuum and rising to 130° C. under 15" vacuum, yielding 770 grams of solid resin having a molecular weight of approximately 1400.

Example 16

A reaction system consisting of 150 grams p-tert.butyl phenol, 150 grams benzene, 120 grams 50% formalin, and 6 grams solid caustic soda, was provided. The p-tert.butyl phenol, benzene and the solid caustic soda were heated to reflux in a reaction vessel until the caustic soda had dissolved and the formalin was metered into the reaction vessel during a period of 1 hour, the temperature of the reaction vessel being 90° C. at commencement of formalin addition and being 75° C. at completion of formalin addition. The reaction mixture was refluxed for an additional period of 3 hours; acidified to pH 6.9 by addition of 20 grams oxalic acid; the aqueous/salt phase (bottom layer) drained off; and the resin-forming product present in solution in the residual benzene was etherified by distillation of said solution for a period of 40 minutes, commencing at 70° C. under 26" vacuum and rising to 115° C. under 26" vacuum, to yield a solid resin.

Example 17

A reaction system consisting of 600 grams p-tert.butyl phenol, 600 grams toluene, 480 grams 50% formalin, and 12 grams solid caustic soda, was provided. The p-tert.butyl phenol, toluene, the solid caustic soda and formalin were heated to reflux in a reaction vessel at 88° C. for a period of 2 hours; acidified to pH 4.4 by addition of 24.7 grams phosphoric acid (89% wt.); the aqueous/salt phase (bottom layer) drained off; and the resin-forming product present in solution in the residual toluene was etherified by distillation of said solution for a period of 3 hours, commencing at 80° C. under 15" vacuum and rising to 120° C. under 15" vacuum, to yield a solid resin.

Example 18

A reaction system consisting of 300 grams p-tert.butyl phenol, 300 grams toluene, 240 grams 50% formalin, and 15.9 grams sodium carbonate dissolved in 160 grams water, was provided. The p-tert.butyl phenol, toluene and formalin were heated to reflux in a reaction vessel and the sodium carbonate solution was metered into the reaction vessel during a period of 1 hour. The reaction mixture was refluxed for an additional period of 1 hour; acidified to pH 6.9 by the addition of 12 grams phosphoric acid (89% wt.); the aqueous/salt phase (bottom layer) drained off; and the resin-forming product present in solution in the residual toluene was etherified by distillation of said solution for a period of 4 hours, commencing at 60° C. under 27" vacuum and rising to 130° C. under 23" vacuum, to yield 384 grams of solid resin.

Example 19

A reaction system consisting of 136 grams p-isopropyl phenol, 150 grams toluene, 121 grams 50% formalin, and 6 grams caustic soda dissolved in 60 grams water, was provided. The p-isopropyl phenol, toluene and formalin were heated to reflux in a reaction vessel and the caustic soda solution was metered into the reaction vessel during a period of 1 hour. The reaction mixture was refluxed for an additional period of 1 hour; acidified to pH 6.9 by the addition of 6.2 grams phosphoric acid (89% wt.); the aqueous/salt phase (bottom layer) drained off; and the resin-forming product present in solution in the residual toluene was etherified by distillation of said solution for a period of 1.25 hours, commencing at 80° C. under 13" vacuum and rising to 126° C. under 13" vacuum, to yield 167 grams of solid resin.

Example 20

A reaction system consisting of 300 grams p-tert.butyl phenol, 300 grams butyl acetate, 240 grams 50% formalin, and 24 grams caustic soda dissolved in 24 grams water, was provided. The p-tert.butyl phenol, butyl acetate and formalin were heated to reflux in a reaction vessel and the caustic soda solution was metered into the reaction vessel during a period of 1.5 hours. The reaction mixture was refluxed for an additional period of 1.5 hours; acidified to pH 5 by the addition of 24.3 grams phosphoric acid (89% wt.); the aqueous/salt phase (bottom layer) drained off; and the resin-forming product present in solution in the residual butyl acetate was etherified by distillation of said solution for a period of 1.5 hours, commencing at 70° C. under 15" vacuum and rising to 120° C. under 27" vacuum, to yield a solid resin.

Example 21

A resin in solution form was prepared from a reaction mixture as described and processed in Example 6. The resin in the toluene solution was reacted with 34 grams magnesium oxide at a temperature below 25° C. for 3 hours.

The magnesium oxide reactivity of the resins produced in accordance with the invention, as referred to in the foregoing examples, is evaluated as follows: 6.6 grams solid resin or the equivalent as a resin/solution product obtained as indicated in the foregoing examples is dissolved in 32.5 grams of toluene; 0.6 gram of magnesium oxide is added; the mixture shaken for 5 hours at ambient temperature; excess magnesium oxide is removed by filtration and weighed, from which the amount reacted is expressed as a percentage of the original weight.

I claim:

1. In the process for the preparation of a p-substituted phenol-formaldehyde resin which comprises:
   (a) reacting 1 part by weight of phenolic component selected from the group consisting of alkyl p-substituted phenols, aryl p-substituted phenols and mixtures thereof with between 1.0 and 2.5 parts of formaldehyde in the presence of an inorganic alkaline catalyst to form a 2-methylol or 2,6-dimethylol substituted phenol monomeric addition product or mixture of said products;
   (b) acidifying the reaction product and separating the aqueous phase;
   (c) heating the 2-methylol or 2,6-dimethylol substituted phenol monomeric addition product or mixture of said products to yield a substituted phenol-formaldehyde condensation product; and
   (d) recovering the resinous condensation product from the reaction medium;

the improvement which comprises:
   (1) adding the substituted phenol or mixture of substituted phenols and formaldehyde to a two phase reaction medium having an aqueous phase and a water immiscible phase wherein the water content is in the range of 45 to 200 parts by weight, the water immiscible organic solvent is in the range of 25 to 150 parts by weight per mole of phenolic component, and the said organic solvent is a solvent for the phenolic component, the methylol addition product and the phenol formaldehyde condensation product;
   (2) heating the two phase reaction medium at a temperature in the range of 40 to 100° C. in the presence of 0.040 to 0.50 mole inorganic alkaline catalyst per mole of phenolic component for ½ to 3 hours;
   (3) adding aqueous acid solution to reduce the pH of the aqueous phase to the range of 2 to 8, thereby converting the inorganic alkaline catalyst into a salt which enters the aqueous phase and separating the aqueous phase from the water immiscible phase;
   (4) heating the water immiscible phase at a temperature in the range of 60–180° C. for a period of 1–7 hours to effect etherification of the 2-methylol or 2,6-dimethylol substituted phenol or mixture of said phenols and form the substituted phenol-formaldehyde condensation product; and
   (5) distilling to remove some or all of the water immiscible phase.

2. The process of claim 1, wherein the inorganic alkaline catalyst is metered as an aqueous solution over the period of ½ to 3 hours into the two phase reaction mixture at a temperature in the range of 40–100° C.

3. The process of claim 1, wherein the formaldehyde is added as a formalin solution.

4. The process of claim 3, wherein the formalin solution is metered over a period of ½ to 3 hours into the two phase reaction mixture at a temperature in the range of 40–100° C.

5. The process of claim 1, wherein the water immiscible phase is subjected to azeotropic distillation for removal of water of reaction during the etherification step.

6. In a process for the preparation of p-substituted phenol-formaldehyde resin which comprises:
   (a) reacting 1 part by weight of phenolic component selected from the group consisting of alkyl p-substituted phenols, aryl p-substituted phenols and mixtures thereof with between 1.0 and 2.5 parts of formaldehyde in the presence of an inorganic alkaline catalyst to form a 2-methylol or 2,6-dimethylol substituted phenol monomeric addition product or mixture of said products;
   (b) separating the aqueous phase;
   (c) heating the 2-methylol or 2,6-dimethylol substituted phenol monomeric addition product or mixture of said products to yield a substituted phenol-formaldehyde condensation product;
   (d) acidifying the reaction product and separating the aqueous phase; and
   (e) recovering the resinous condensation product from the reaction medium;

the improvement which comprises:
   (1) adding the substituted phenol or mixture of substituted phenols and formaldehyde to a two phase reaction medium having an aqueous phase and a water immiscible phase wherein the water content is in the range of 45 to 200 parts by weight, the water immiscible organic solvent is in the range of 25 to 150 parts by weight per mole of phenolic component, and the said organic solvent is a solvent for the phenolic component, the methylol addition product and the phenol formaldehyde condensation product;
   (2) heating the two phase reaction medium at a temperature in the range of 40 to 100° C. in the presence of 0.040 to 0.50 mole inorganic alkaline catalyst per mole of phenolic component for ½ to 3 hours;

(3) separating the aqueous phase from the water immiscible phase;

(4) heating the water immiscible phase and subjecting it to azeotropic distillation at a temperature in the range of 60–180° C. for a period of 1–7 hours to effect etherification of the 2-methylol or 2,6-dimethylol substituted phenol or mixture of said phenols, forming the substituted phenol-formaldehyde condensation product and removing the water of reaction;

(5) adding aqueous acid solution to convert the inorganic alkaline catalyst into a salt which enters the aqueous phase, sufficient acid being added to give a final pH in the range of 2 to 8, and separating the aqueous phase from the water immiscible phase; and (6) distilling to remove some or all of the water immiscible phase.

7. The process of claim 6, wherein the inorganic alkaline catalyst is metered as an aqueous solution over the period of ½ to 3 hours into the two phase reaction mixture at a temperature in the range of 40–100° C.

8. The process of claim 6, wherein the formaldehyde is added as a formaline solution.

9. The process of claim 6, wherein the formalin solution is metered over a period of ½ to 3 hours into the two phase reaction mixture at a temperature in the range of 40–100° C.

References Cited

UNITED STATES PATENTS

| | | | |
|---|---|---|---|
| 2,647,873 | 8/1953 | Matthews | 260—51 |
| 2,912,395 | 11/1959 | Graham | 260—51 |
| 3,016,357 | 1/1962 | Vogel | 260—51 |
| 3,058,954 | 10/1962 | Brown | 260—51 |
| 3,419,527 | 12/1968 | Akutin et al. | 260—57 |
| 3,691,121 | 9/1972 | Anderson et al. | 260—53 R |

HOWARD E. SCHAIN, Primary Examiner

U.S. Cl. X.R.

260—25, 51 R, 57 R, 60, 845